United States Patent
Howarth

(10) Patent No.: US 10,590,856 B2
(45) Date of Patent: Mar. 17, 2020

(54) GAS TURBINE ENGINE HAVING AN ANNULAR CORE BLEED

(71) Applicant: ROLLS-ROYCE PLC, London (GB)

(72) Inventor: Nicholas Howarth, Derby (GB)

(73) Assignee: ROLLS-ROYCE PLC, London (GB)

( * ) Notice: Subject to any disclaimer, the term of this patent is extended or adjusted under 35 U.S.C. 154(b) by 531 days.

(21) Appl. No.: 14/797,871

(22) Filed: Jul. 13, 2015

(65) Prior Publication Data

US 2016/0040605 A1  Feb. 11, 2016

(30) Foreign Application Priority Data

Aug. 8, 2014  (GB) .................................. 1414071.9

(51) Int. Cl.
| | |
|---|---|
| *F02C 9/18* | (2006.01) |
| *F01D 17/10* | (2006.01) |
| *F02C 3/13* | (2006.01) |
| *F01D 25/26* | (2006.01) |
| *F02C 3/04* | (2006.01) |

(52) U.S. Cl.
CPC .............. *F02C 9/18* (2013.01); *F01D 17/105* (2013.01); *F01D 25/26* (2013.01); *F02C 3/04* (2013.01); *F02C 3/13* (2013.01); *F05D 2220/32* (2013.01); *F05D 2220/323* (2013.01); *F05D 2250/50* (2013.01); *F05D 2260/606* (2013.01); *F05D 2260/96* (2013.01); *F05D 2270/101* (2013.01);
(Continued)

(58) Field of Classification Search
CPC ...... F02C 3/04; F02C 3/13; F02C 9/18; F05D 2220/323; F05D 2270/101; F01D 17/105
See application file for complete search history.

(56) References Cited

U.S. PATENT DOCUMENTS

| | | | | |
|---|---|---|---|---|
| 2,354,213 A | * | 7/1944 | Jendrassik | ................ F02C 7/26 60/39.17 |
| 2,529,973 A | * | 11/1950 | Sédille et al. | .......... F02C 7/268 60/262 |

(Continued)

FOREIGN PATENT DOCUMENTS

| | | |
|---|---|---|
| CH | 244 432 A | 9/1946 |
| DE | 23 28 460 A1 | 1/1975 |

(Continued)

OTHER PUBLICATIONS

Dec. 17, 2015 Search Report issued in European Patent Application No. 15176392.

(Continued)

*Primary Examiner* — Carlos A Rivera
(74) *Attorney, Agent, or Firm* — Oliff PLC

(57) ABSTRACT

A gas turbine engine including a compressor, a turbine having one or more stages and a combustor, the combustor being located between the compressor and turbine. The gas turbine engine further includes a bleed from a core defined by a core duct, the core duct surrounding and extending between the turbine and combustor at least. The bleed includes at least one inlet located downstream of the combustor and upstream of at least one of the turbine stages. The turbine is arranged in use to drive the compressor. The bleed is arranged to be controllable in use to selectively bleed air from the core through the inlet and to thereby control the power delivered by the turbine to the compressor.

19 Claims, 2 Drawing Sheets

(52) U.S. Cl.
CPC ....... *F05D 2270/301* (2013.01); *Y02T 50/671* (2013.01)

(56) References Cited

U.S. PATENT DOCUMENTS

| | | | |
|---|---|---|---|
| 2,858,671 A | 11/1958 | Fox | |
| 3,472,487 A * | 10/1969 | Heinz | F01D 17/06 415/144 |
| 3,601,983 A * | 8/1971 | Guillot | F02C 9/18 415/145 |
| 4,005,575 A * | 2/1977 | Scott | F02C 9/18 415/61 |
| 4,435,958 A * | 3/1984 | Klees | F02K 3/075 60/204 |
| 5,163,286 A * | 11/1992 | Jaw | F02C 3/10 60/39.17 |
| 5,341,636 A * | 8/1994 | Paul | F01D 5/18 60/39.17 |
| 6,647,708 B2 * | 11/2003 | Bornhoft | F02C 3/13 60/226.1 |
| 7,246,482 B2 * | 7/2007 | Mahoney | F02C 3/13 60/204 |
| 7,353,647 B2 * | 4/2008 | Orlando | F02C 3/04 60/204 |
| 8,683,811 B2 * | 4/2014 | Clemen | F02C 6/08 60/204 |
| 2005/0252194 A1 | 11/2005 | Orlando et al. | |
| 2009/0293449 A1 * | 12/2009 | Venter | F02C 9/18 60/226.1 |
| 2010/0154383 A1 * | 6/2010 | Ress, Jr. | F02C 7/36 60/226.3 |

FOREIGN PATENT DOCUMENTS

| | | | |
|---|---|---|---|
| DE | 2328460 A1 * | 1/1975 | ............. F02C 6/206 |
| EP | 1 617 053 A2 | 1/2006 | |
| EP | 1 719 890 A1 | 11/2006 | |
| JP | H09-287520 A | 11/1997 | |
| JP | H11-303682 A | 11/1999 | |
| JP | 3903270 B2 | 4/2007 | |

OTHER PUBLICATIONS

Feb. 9, 2015 Search Report issued in British Application No. GB1414071.9.

* cited by examiner

GAS TURBINE ENGINE HAVING AN ANNULAR CORE BLEED

The present disclosure concerns gas turbine engines, aircraft and a method of controlling the power delivered by a turbine to a compressor of a gas turbine engine. The disclosure may have particular application to aero gas turbine engines, but this is not intended to be limiting.

A compressor map for a gas turbine engine compressor may indicate the working line for that compressor, i.e. the pressure ratio across the compressor against steady state flow rate through the compressor. Non-steady state operating conditions (e.g. accelerations or decelerations) may cause the working line to deviate. Where the deviation is towards a higher pressure ratio across the compressor for a given flow rate through the compressor, the deviation in the working line will be towards a surge-line. The surge-line indicates the pressure ratio across the compressor that would give rise to a surge for a particular flow rate through the compressor and the margin between the working line and surge-line is the surge margin. During a surge there is an undesirable breakdown of the normal flow through the engine and potentially a temporary reversal of the fluid flow direction.

A deviation in the working line towards and possibly beyond the surge-line may result from low engine power settings. Where a gas turbine engine is optimised between aircraft cruise and climb power settings, a high pressure compressor may be unable to absorb the flow generated by an intermediate pressure compressor when the engine is operating at part power settings. This may increase the pressure ratio across the intermediate pressure compressor and raise its working line. A rapid throttle change is further example of an event that may give rise to similar working line deviation. Rapid throttle changes may mean that the change in engine power does not approximate passage through a succession of steady state operating points. Instead the response of a spool to a change in engine fuel supply may lag the change as a consequence of spool inertia. Where for example there is a deceleration, a high pressure spool and compressor might respond less quickly than an intermediate pressure spool and compressor. This in turn may cause an increase in pressure across the intermediate compressor. The increased pressure ratio across the intermediate pressure compressor may cause its working line to rise, decreasing or eliminating its surge margin.

A traditional method of addressing the problem described above is to provide a bleed immediately downstream of the compressor that might surge in certain operating regimes. This allows selective removal of air downstream of the compressor, allowing a reduction of the pressure ratio across the compressor and an increase in surge margin. At least in the case of aero gas turbines, this approach tends however to be inefficient because the bled air tends to be dumped overboard, giving very little thrust recovery. Alternatively the bleed air may be vented into a bypass duct of the gas turbine engine. Once again however this provides limited thrust recovery, may disadvantageously impact on the flow through the bypass duct, cause deleterious pressure field variation impacting on the fan and an increase noise.

According to a first aspect of the invention there is provided a gas turbine engine comprising optionally a compressor, optionally a turbine having one or more stages and optionally a combustor, the combustor being optionally located between the compressor and turbine, and where the gas turbine engine optionally further comprises a bleed from a core defined by a core duct, the core duct optionally surrounding and extending between the turbine and combustor at least, the bleed optionally comprising at least one inlet located downstream of the combustor and upstream of at least one of the turbine stages, the turbine being optionally arranged in use to drive the compressor and the bleed being optionally arranged to be controllable in use to selectively bleed air from the core through the inlet and to thereby control the power delivered by the turbine to the compressor.

As will be appreciated, the first aspect may allow the power delivered by the turbine to be selectively reduced, thereby reducing the pressure ratio generated by the compressor and unloading it aerodynamically. As will be appreciated the bleed directly controls the pressure ratio across the turbine rather than the compressor (i.e. the driving element rather than the driven element), but is still capable of selectively lowering the working line of the compressor.

The use of a bleed rather than variable geometry turbine technology may reduce mechanical complexity and weight. The bleed may further reduce or eliminate the need for bleeding to occur upstream of the combustor, giving potential benefits in terms of specific fuel consumptions and noise reduction. In particular bleeding air downstream of the combustor may offer new and/or improved opportunities for thrust recovery from the bleed. There may for example be a reduction in the bypass ducting that would be required in order to return the air to the core flow at a suitable location for thrust recovery. Further, reducing the quantity of air bled and dumped into a bypass duct may reduce noise and interference with bypass duct flow.

In some embodiments the gas turbine engine comprises one or more additional compressors and one or more additional turbines. Further the turbine may be arranged in use to drive one or more of the additional compressors (e.g. via a gearbox).

In some embodiments the turbine is the first turbine in the core with one or more of the additional turbines downstream thereof. The turbine may for example be a high pressure turbine and the compressor a high pressure compressor.

In some embodiments the turbine is downstream of at least one of the additional turbines. The turbine may for example be an intermediate pressure turbine and the compressor an intermediate pressure compressor. The invention may have particular application to intermediate pressure turbines and compressors. In three shaft engines it may be the intermediate pressure turbine that is in greatest need of working line modification at particular points of its operating envelope. Alternatively the turbine may for example be a low pressure turbine and the compressor a low pressure compressor such as a fan. Where the compressor is a fan, the bleed may be used to selectively reduce the thrust produced by the fan at lower power settings (e.g. during descent, landing and taxiing of an aircraft powered by the gas turbine engine). This might for example allow faster descent (which may be convenient for air traffic control), slower taxiing and/or reduced aircraft brake wear.

In some embodiments the bleed inlet is located between the at least one turbine stage and the nearest upstream additional turbine.

In some embodiments the bleed further comprises a bypass passage and at least one outlet, the bypass passage leading from the inlet at one end to the outlet at the other end, the outlet exiting into the core downstream of the turbine. It may be preferable to return the bleed air to the core, as this may offer opportunities for thrust recovery and may negate any need to dump the air into a bypass duct. Dumping the air into a bypass duct may interfere with the bypass flow and increase noise.

In some embodiments the bypass passage comprises an annulus formed in the core duct. The core duct may for example bifurcate defining an annulus between the bifurcated walls. The use of an annular passage may be preferable to the use of a conduit (which might also be used). Where an annular passage is used, multiple outlets may be located around the annulus or a single annular outlet may be used.

In some embodiments a valve is provided at one or more of the inlets and/or one or more of the outlets for selective control of the quantity of air bled.

In some embodiments the core duct provides a continuous unbroken barrier around the core in the vicinity of the valve. In such cases the valve does not therefore require a through-bore passing entirely through the core duct in order that it can be actuated. A mobile valve body of the valve may for example be actuated by a controllable electromagnet located outside of the core duct. The core duct may then provide a continuous unbroken barrier between the valve body and electromagnet. This may be preferable to actuation means requiring a through-bore through the core duct, such a through-bore providing a potential air leakage path through the core duct.

In some embodiments the bleed outlet is downstream of all additional turbines. This may be desirable where it is preferable to simply dump the bleed air without it impacting on the flow through any and all additional turbines.

In some embodiments the bleed outlet is upstream of at least one stage of at least one of the additional turbines. In this way energy from the bleed air may be extracted by the downstream additional turbine(s), increasing efficiency.

In some embodiments the bleed outlet is located between the turbine and at least one stage of the nearest downstream additional turbine.

In some embodiments the bleed is arranged to remove a maximum of between 10 and 30% of the flow and in some embodiments a maximum of between 15 and 25% of the flow. Preferably the bleed is arranged to remove a maximum of approximately 20% of the flow.

In some embodiments the gas turbine engine is an aero engine.

According to a second aspect of the invention there is provided a gas turbine engine according to that of the first aspect and arranged for use as an aero engine.

According to a third aspect of the invention there is provided an aircraft comprising a gas turbine engine in accordance with the first or second aspect.

According to a fourth aspect of the invention there is provided a method of controlling the power delivered by a turbine to a compressor of a gas turbine engine comprising selectively bleeding off core air upstream of at least one stage of the turbine and downstream of a combustor of the gas turbine engine.

In some embodiments the method further comprises returning the bleed air to the core downstream of the turbine.

In some embodiments the method further comprises bleeding more air in response to an actual or predicted decrease in surge margin of the compressor. The method may for example comprise monitoring the gas turbine engine operating regime (e.g. by monitoring engine performance parameters and/or ambient conditions) and/or engine control inputs (e.g. from an operator such as a pilot of from an automated control system such as a FADEC) to predict and/or detect a decrease in surge margin. The increase in bleed being conducted in response to the predicted or actual decrease in surge margin to check that decrease. As will be appreciated a predicted and/or actual increase in surge margin may be correspondingly checked by a decrease in bleed. The control of the bleed quantity in this way may increase efficiency whilst maintaining a desired surge margin.

The skilled person will appreciate that a feature described in relation to any one of the above aspects of the invention may be applied mutatis mutandis to any other aspect of the invention.

Embodiments of the invention will now be described by way of example only, with reference to the Figures, in which.

Figure 1:
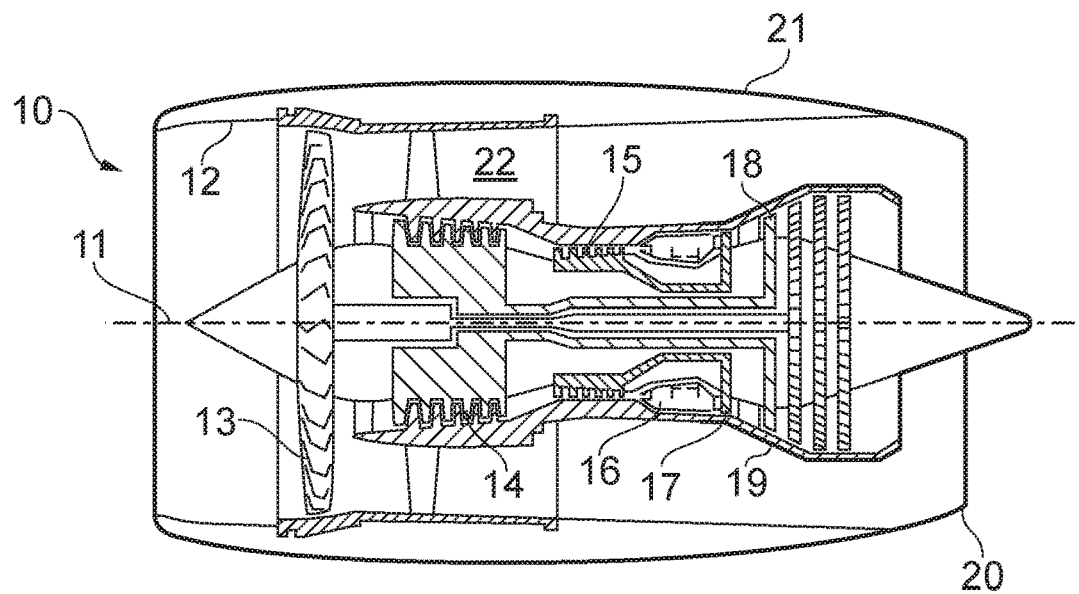
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
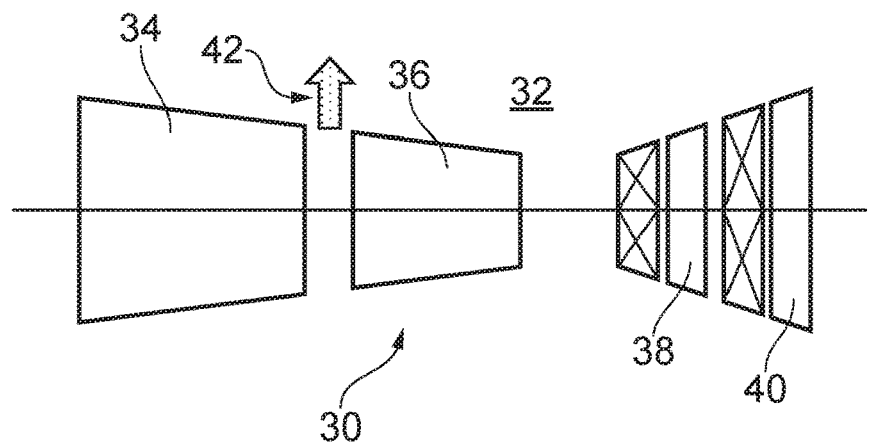
FIG. 2 is a schematic view of a prior art gas turbine engine illustrating a known compressor bleed arrangement.

Referring now to FIG. 2 a bleed system as might conventionally be used on gas turbine engine 10 is shown schematically. Shown in the Figure is a core 30 of a gas turbine engine 32. The core 30 comprises in axial flow series an intermediate pressure compressor 34, a high pressure compressor 36, a high pressure turbine 38 and an intermediate pressure turbine 40. A combustor (not shown) is also provided between the high pressure compressor 36 and high pressure turbine 38. A bleed generally provided at 42 has an inlet (not shown) provided between the intermediate 34 and high 36 pressure compressors, providing an exit from the core 30 through a core duct (not shown). The bleed 42 provides a conduit (not shown) with an outlet (not shown) into a bypass duct (not shown) of the gas turbine engine 10. The bleed 42 is valve controlled, such that the quantity of air bled from the core can be modulated.

In use the bleed 42 provides a measure of control over the working line of the intermediate pressure compressor 34. Increased flow through bleed 42 will reduce the pressure ratio across the intermediate pressure compressor 34, lowering its working line and increasing the surge margin.

Disadvantageously however the air dumped into the bypass duct offers little thrust recovery, causes changes in the bypass duct pressure field which may negatively impact on the performance of an upstream fan (not shown) and negatively impact on the air flow through the bypass duct. Further the dumping of the air into the bypass duct tends to cause an increase in noise.

Figure 3:
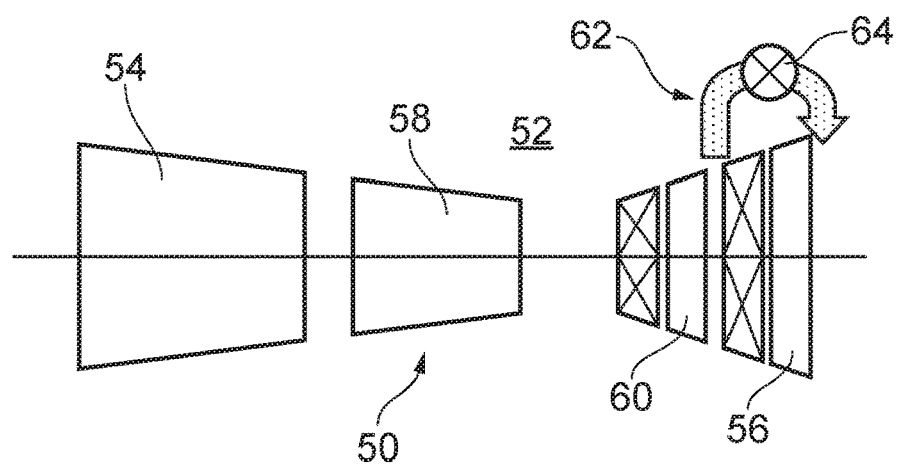
FIG. 3 is a schematic view of a gas turbine engine according to an embodiment of the invention.

Referring now to FIG. 3 a schematic representation of a core 50 of a gas turbine engine 52 is shown. The core 50 comprises a compressor 54 (in this case an intermediate pressure compressor) and a turbine 56 (in this case an intermediate pressure turbine). The compressor 54 and turbine 56 are linked by a shaft via which in use the turbine 56 drives the compressor 54. In addition the core 50 has an additional compressor 58 (in this case a high pressure compressor) and an additional turbine 60 (in this case a high pressure turbine) which are also linked by a shaft. In axial flow series there is the compressor 54, the additional compressor 58, a combustor (not shown), the turbine 56 and the additional turbine 60. Surrounding the compressors 54, 58, combustor and turbines 56, 60 is a core duct (not shown).

The gas turbine engine 52 is further provided with a bleed generally provided at 62. The bleed 62 has an inlet (not shown) located downstream of the combustor and additional turbine 60 and upstream of the turbine 56, providing an exit from the core 50 through the core duct. As will be appreciated in other embodiments it may be that the inlet is not located upstream of the whole turbine 56 but is nonetheless upstream of one or more of its stages. The inlet comprises multiple discrete inlet openings (not shown) located about the turbine 56 intake annulus. A bypass passage (not shown) leads from the inlet to an outlet (not shown). The outlet passes through the core duct and exhausts the bypass passage back into the core 50. The outlet is located downstream of the turbine 56 and upstream of an exhaust aperture (not shown). A valve 64 is provided within the bypass passage to allow selectively variable degrees of bypass opening. In other embodiments the valve 64 (or multiple valves which may be operated independently or together) may be located at any alternative appropriate location, for instance one at each inlet or outlet opening.

In use the bleed 62 provides a measure of control over the working line of the compressor 54. By varying the quantity of air that is bled from the core flow in the core 50 upstream of the turbine 56, the working line of the compressor 54 can be controlled. Where core flow is bled, it bypasses the turbine 56, having the effect of reducing the pressure ratio across it. This in turn reduces the speed of the turbine 56 and consequently the compressor 54, reducing the pressure ratio generated by the compressor 54 and unloading it aerodynamically.

Varying the quantity of air that is bled from the core flow is achieved by actuation of the valve 64 in the bypass passage. Control of the valve 64 is in accordance with a bleed schedule. Measured engine parameters (such as temperatures, pressures and or shaft speed) are used to calculate the compressor non dimensional flow, giving a measure of compressor operation with respect to surge. Because the available margin between the working line and surge line varies with flow, scheduling the degree of valve 64 opening in accordance with that flow allows control of the surge margin. The schedule is arranged to maintain sufficient margin between the surge and working lines in order to account for all variation in surge and working lines envisaged during service life of the engine. Generally the schedule may determine that more air is bled in response to an actual or predicted decrease in surge margin of the compressor.

In some embodiments additional schedules may be provided and used under different engine operating conditions. During transient operation the compressor 54 will move away from the steady state working line due to a variety of aero/thermodynamic effects. In this case more margin is required and a separate transient bleed schedule may be provided to control this. Separate bleed schedules may also be provided for approach idle, reverse thrust operation, detection of water ingestion and/or detection of surge. Each schedule may be designed to alter the engine matching in the most advantageous way.

The use of the turbine 56 bypass bleed 62 may reduce the required capacity or eliminate altogether the need for a more conventional bleed associated with the compressor 54 (as described for instance with reference to FIG. 2). Consequently noise produced by the bleeding of air from the core may be reduced. By bypassing the turbine of interest, the bypass passage may be substantially shorter than a similar bypass that might for example bypass air from a compressor region to a turbine region, thereby saving weight and reducing mechanical complexity. Furthermore, because the bled air is returned to the core, thrust recovery may be improved, especially where there is an additional turbine downstream of the bleed outlet and deleterious effects on the bypass flow may be avoided.

A further potential benefit is that operation of the valve may give rise to heating of the core duct. This in turn may expand the core duct in the region of the turbine and thereby increase turbine tip. This may supplement the effect of bleeding air upstream of the turbine, further reducing the work performed by the turbine.

Figure 4:
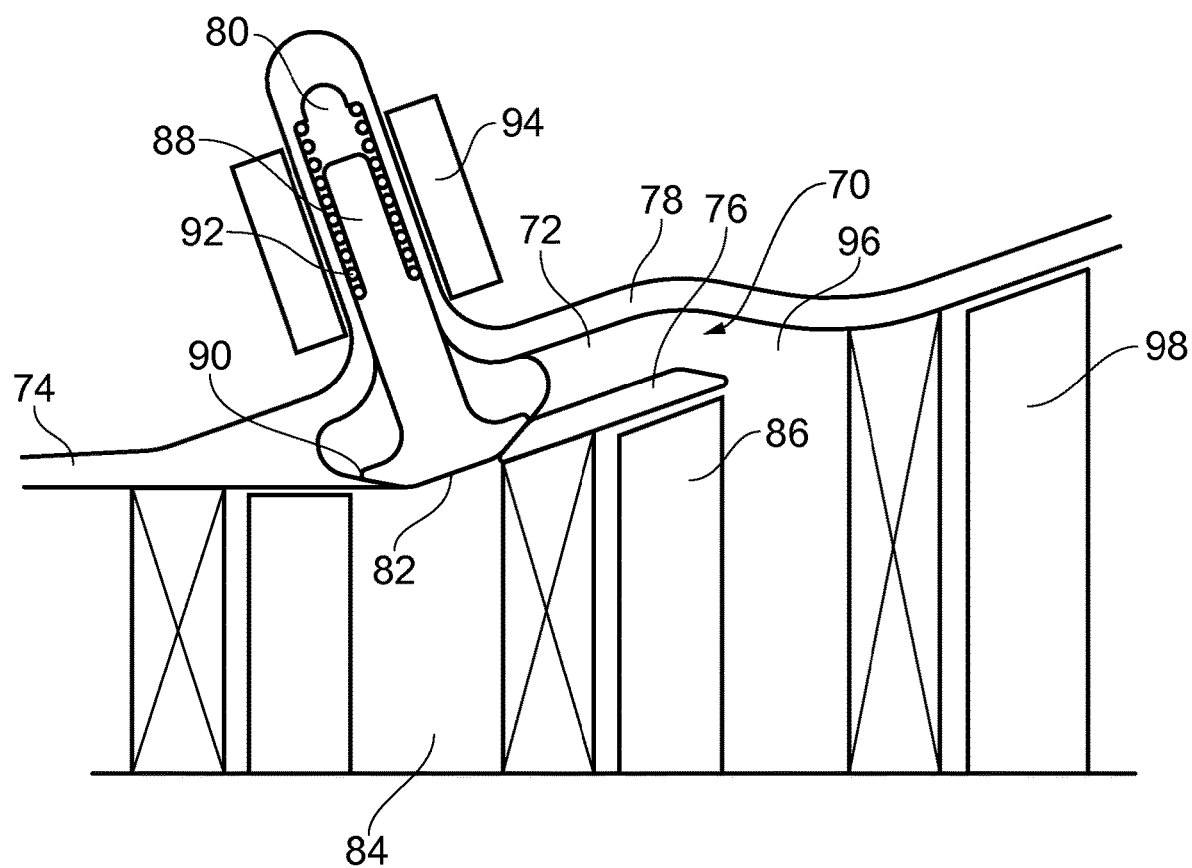
FIG. 4 is a cross-sectional view showing a bleed arrangement according to an embodiment of the invention.

Referring now to FIG. 4, additional detail is provided concerning an exemplary bleed arrangement (generally shown at 70) that may be used in the manner described above. In the embodiment of FIG. 4 a bypass passage 72 is an annular cavity formed in a core duct 74 itself. The core duct 74 defines the annular cavity by bifurcating around its circumference to provide separated radially inner 76 and radially outer 78 walls. Generally the radially inner 76 and outer 78 walls extend in the substantially axial direction, but the radially outer wall 78 is also shaped to define a plurality of valve housings 80 (only one shown) at circumferentially spaced intervals around the annular cavity.

Each valve housing 80 extends in a substantially radial direction and is enclosed by the radially outer wall 78 (which is unbroken in this region) on all sides with the exception of an opening to the annular cavity. Each valve housing 80 is axially and circumferentially aligned with a corresponding inlet 82 (only one shown) to the annular cavity passing through the radially inner wall 76 at an upstream end of the annular cavity. Each inlet 82 is in fluid communication with a core 84 upstream of a turbine 86 in the core 84.

Each valve housing 80 accommodates part of a valve body 88, the valve body 88 being biased towards and into engagement with a valve seat 90 surrounding the relevant inlet 82 by a spring 92. The valve body 88 is selectively retractable from the valve seat 90, to open the inlet 82, against the biasing of the spring 92, via activation of an electromagnet 94 surrounding the valve housing 80 outside of the radially outer wall 78.

At a downstream end of the annular cavity is an annular outlet 96 in fluid communication with the core 84 upstream of an additional turbine 98. Downstream of the annular cavity the core duct 74 is provided by a continuation of the outer radial wall 78.

The use of the annular cavity (as described with respect to FIG. 4) may be preferably to use of one or more conduits which might otherwise be used. Conduits may be susceptible to leaks and/or failure. Conduits may also be complex to fit, increase weight and/or give rise to vibration problems.

The defining of the valve housing 80 by means of the outer wall 78 and further the use of the electromagnetic actuation mechanism, may mean that it is not necessary to provide a penetration through the core duct in order that the valve is accommodated and/or actuatable. This may reduce the likelihood of air leaking from the core 84 at the site of the valve.

As will be appreciated the bleed arrangement is not limited to that shown in FIG. 4. By way of example the valve or valves may be provided at an alternative location, for instance at the outlet or outlets.

It will be understood that the invention is not limited to the embodiments above-described and various modifications and improvements can be made without departing from the various concepts described herein. By way of example the engine architecture in terms of numbers of compressors and turbines and their respective connections is not limiting. Further the invention may be applied to any turbine or indeed multiple turbines within the engine. Except where mutually exclusive, any of the features may be employed separately or in combination with any other features and the invention extends to and includes all combinations and sub-combinations of one or more features described herein in any form of gas turbine engine.

The invention claimed is:

1. A gas turbine engine comprising:
 a core including a compressor, one or more turbines each having one or more turbine stages, and a combustor, the combustor being located between the compressor and the turbine, and
 a bleed from the core, the bleed defined by a core duct, the core duct surrounding the turbine and the combustor and extending between the turbine and the combustor, the bleed comprising at least one inlet, a bypass passage, and an outlet, wherein
 the at least one inlet is located downstream of at least a first one of the turbine stages and upstream of at least a second one of the turbine stages,
 the bypass passage is an annular cavity, the annular cavity extending circumferentially around the core,
 the bypass passage leads from the at least one inlet at a first end to the outlet at a second end,
 the outlet exits into the core duct downstream of the turbine and upstream of an exhaust aperture of the core, and
 the turbine is arranged in use to drive the compressor, and the bleed is arranged to be controllable in use to selectively bleed air from the core through the at least one inlet and to thereby control the power delivered by the turbine to the compressor.

2. The gas turbine engine according to claim 1, wherein the bypass passage comprises an annulus formed in the core duct.

3. The gas turbine engine according to claim 2, further comprising one or more additional compressors and one or more additional turbines.

4. The gas turbine engine according to claim 3, wherein the turbine is the first turbine in the core with one or more of the additional turbines downstream thereof.

5. The gas turbine engine according to claim 3, wherein the turbine is downstream of at least one of the additional turbines.

6. The gas turbine engine according to claim 5, wherein the at least one inlet is located between the at least one turbine stage and the nearest upstream additional turbine.

7. The gas turbine engine according to claim 2, wherein the outlet is downstream of all of the one or more additional turbines.

8. The gas turbine engine according to claim 2, wherein the outlet is upstream of at least one stage of at least one of the one or more additional turbines.

9. The gas turbine engine according to claim 8, wherein the outlet is located between the turbine and at least one stage of a nearest downstream one of the one or more additional turbines.

10. The gas turbine engine according to claim 1, wherein the bleed is arranged to remove a maximum of between 10 and 30% of the flow to the inlet of the turbine.

11. The gas turbine engine according to claim 1 arranged for use as an aero engine.

12. An aircraft comprising the gas turbine engine in accordance with claim 1.

13. A method of controlling the power delivered by a turbine to a compressor of a gas turbine engine comprising:
 providing the gas turbine engine of claim 1; and
 selectively bleeding off core air upstream of the at least one stage of the turbine and downstream of the combustor of the gas turbine engine.

14. The method according to claim 13, further comprising returning the bleed air to the core downstream of the turbine.

15. The method according to claim 13, wherein more air is bled in response to an actual or predicted decrease in surge margin of the compressor.

16. The gas turbine engine according to claim 1, wherein the core duct is bifurcated about a circumference thereof to provide a radially inner wall separated from a radially outer wall to define the annular cavity there between.

17. The gas turbine engine according to claim 1, wherein the gas turbine engine is configured to provide a first air flow through the core duct and a second air flow that bypasses the core duct.

18. The gas turbine engine according to claim 1, wherein the at least one bleed inlet communicates the core with the annular cavity, and the at least one bleed inlet is opened and closed to selectively bleed air from the core to the annular cavity.

19. The gas turbine engine according to claim 1, wherein the bleed air in the bypass passage flows to the outlet separately from an air flow that bypasses the core duct via a bypass duct between the core duct and a nacelle that surrounds the core duct.

* * * * *